Figure 1:
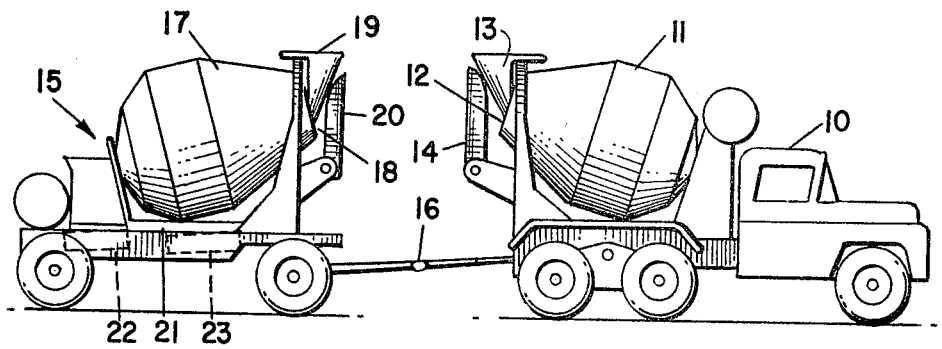

Nov. 1, 1966  R. A. McNEIL  3,282,448

METHOD AND APPARATUS FOR CONVEYING CONSTRUCTION MATERIAL

Filed July 22, 1964

INVENTOR.
ROBERT A. McNEIL
BY Elliott & Pastoriza
ATTORNEYS

United States Patent Office 3,282,448
Patented Nov. 1, 1966

3,282,448
METHOD AND APPARATUS FOR CONVEYING
CONSTRUCTION MATERIAL
Robert A. McNeil, 1915 Ontario, Oxnard, Calif.
Filed July 22, 1964, Ser. No. 384,375
2 Claims. (Cl. 214—38)

This invention relates to a novel method and apparatus for conveying construction material from a first location to a second location, and more particularly to a method and apparatus for handling semi-liquid type construction materials such as cement.

In the construction of tract houses, buildings and similar structures in which there is very limited space available for maneuvering a truck into a desired position, it is the usual practice to provide a single truck, such as a cement mixing truck, and drive the same to the desired position to pour the cement for the foundations and the like. The truck must then return to a home office where the cement is prepared and the truck filled and then driven back to the construction site.

Considerable time and labor could be saved if a larger quantity of cement could be delivered to the site at one time. Such could be effected by providing a trailer for the truck loaded with an equal amount of cement. However, in the situations as described in which limited space is available, it is almost impossible to maneuver a trailer to a position for depositing the cement.

With the foregoing in mind, it is a primary object of this invention to provide a novel method and apparatus for conveying construction materials such as cement in which approximately twice as much material may be deposited as is possible with a single truck and yet in which only one man is necessary for conveying the material.

Briefly, this object is realized in accordance with the method of this invention by providing a pulling vehicle loaded with cement together with a trailer which is also loaded with cement. In accordance with the first step of the method, the pulling vehicle and trailer are driven from the home office to a first location adjacent to the construction site in which there is sufficient room to maneuver the trailer. The pulling vehicle is then disconnected from the trailer and driven to a second location at which the cement is to be deposited. After deposition of the material, the pulling vehicle returns to a position adjacent to the trailer. In accordance with further steps of the method, the portion of material within the trailer is then raised to a level higher than the pulling vehicle and transferred to the pulling vehicle. The pulling vehicle is then again driven to the second location for depositing the portion of material formerly in the trailer.

As a consequence of the unique steps of transferring the contents from the trailer to the pulling vehicle after the pulling vehicle had deposited its initial load, one man may effect the pouring of the cement without the problems involved in attempting to manipulate a trailer about a confined area.

The preferred apparatus for carrying out the method comprises a conventional type pulling vehicle including a cement mixing drum, together with a trailer, also containing similar capacity cement mixing drum. A tow bar structure enables the trailer to be connected or disconnected from the pulling vehicle or truck. The trailer includes structure in the form of raising and lowering means such as hydraulic rams so that the entire drum and thus the contents within the trailer may be positioned higher than the pulling vehicle so that the contents in the trailer may be transferred to the drum in the pulling vehicle.

Figure 2:
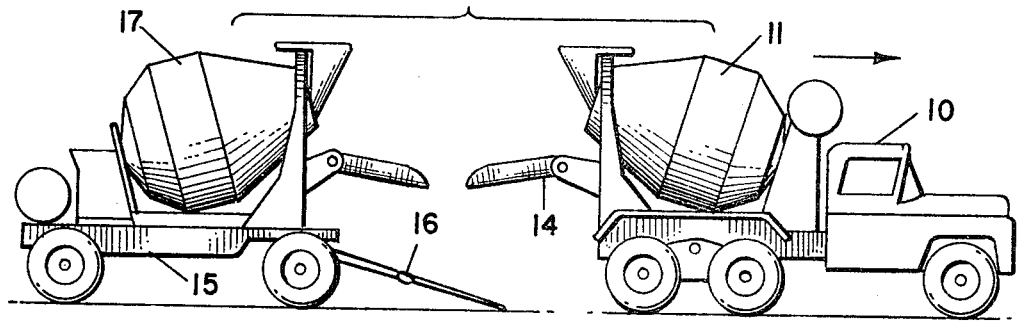
Figure 3:
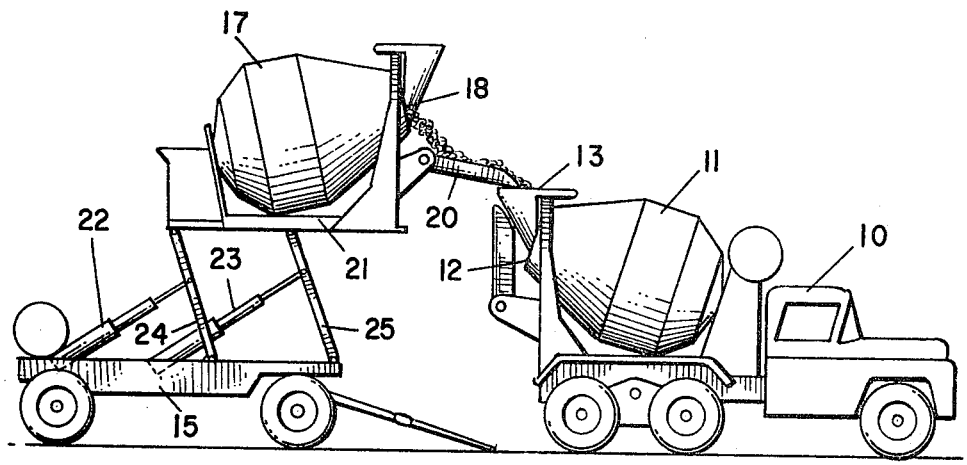

A better understanding of the method and apparatus of this invention will be had by referring to the accompanying schematic drawings, in which:

FIGURE 1 illustrates a pulling vehicle and trailer connected together for performing first steps in the method;
FIGURE 2 illustrates a subsequent step in the method in which the trailer is disconnected from the pulling vehicle; and,
FIGURE 3 illustrates a transferring operation in accordance with the method and apparatus of this invention.

Referring first to FIGURE 1, there is illustrated a pulling vehicle in the form of a cement truck 10 having the usual rotating type cement drum 11. The rear conical end of the cement drum 11 is open at 12 and is arranged to be filled through this opening by a conventional funnel or hopper 13. A pivotable conveyor platform 14 is provided as shown below the opening 12 for depositing cement received from the opening 12.

In accordance with the method and apparatus of this invention, there is provided a trailer 15 arranged to be connected or disconnected from the pulling vehicle 10 as by a tow bar structure 16. The trailer 15 also includes a cement drum 17 which may be of the same capacity as the drum 11 having an end opening 18, hopper 19 and depositing platform 20.

In accord with further features of the invention, there is provided a raising and lowering means for the drum 17 in the form of a movable platform 21 supporting the drum, and cooperating hydraulic ram means 22 and 23. The purpose for this structure will become clearer as the description proceeds.

In accordance with a first step of the method, the drum 11 is filled with cement and at the same time the drum 17 is filled with cement at a home cement manufacturing site. The pulling vehicle 10 and trailer 15 are connected and driven to a particular construction site to a first location in which manipulation of the trailer by the pulling vehicle 10 may be effected without any problem. However, in construction sites of the type under consideration, the locations at which cement is to be poured are often confined and there is not sufficient room for both the truck and trailer. Accordingly, and with reference to FIGURE 2, the truck or pulling vehicle 10 is disconnected from the trailer 15 by disconnecting the tow bar structure 16 and pulling vehicle 10 itself driven to the second location at which deposition of the construction material, such as the cement, is to take place. There is no problem wtih a single truck in maneuvering the same for proper depositing of the cement.

After the cement has been dumped from the pulling vehicle 10, the pulling vehicle returns to the trailer 15 and is parked in a position adjacent to the trailer.

With reference now to FIGURE 3, when the truck 10 has returned to a position adjacent the trailer, the raising and lowering means in the form of the rams 22 and 23 are actuated to raise the platform 21 and thus the trailer drum 17 through the linkages 24 and 25 as illustrated. The arrangement is such that the portion of material within the drum 17 is raised to a position higher than the pulling vehicle 10 such that the portion of cement within the drum 17 may then readily be transferred to the drum 11 of the pulling vehicle 10, as indicated.

After the foregoing operation has been completed, the pulling vehicle 10 is then driven to the second location at which further cement may be deposited. Finally, the pulling vehicle 10 is returned to the trailer, and reconnected thereto and the entire unit then driven to the home office for refilling of the drums.

From the foregoing description, it will thus be evident that the present invention has provided a novel method and apparatus for the conveying of construction material. The entire operation may be carried out by a single person with the advantages of the use of a single truck and yet approximately twice as much material may be handled as a result of the unique feature of the trailer and the method and means for raising the contents thereof to transfer the material therein to the pulling vehicle after the pulling vehicle has effected deposition of its contents.

What is claimed is:

1. A method of conveying construction material of a semi-liquid characteristic from a first location to a second location in which a portion of said material is disposed in a pulling vehicle and another portion in a trailer connected to said pulling vehicle, comprising the steps of: parking said pulling vehicle and said trailer at said first location; disconnecting said pulling vehicle from said trailer; driving said pulling vehicle to said second location; depositing said portion of material from said pulling vehicle at said second location; returning said pulling vehicle to a position at said first location adjacent to said trailer; raising said another portion of material in said trailer to a position above said pulling vehicle; transferring said another portion of said material from said trailer to said pulling vehicle by gravity flow; driving said pulling vehicle to said second location; and depositing said another portion of said material at said second location.

2. An apparatus for conveying semi-liquid construction material to a given location comprising, in combination: a pulling vehicle having a first containing means for carrying a portion of said material; a trailer having a second containing means similar to said first containing means for carrying another portion of said material; means for connecting and disconnecting said pulling vehicle and trailer; and means on said trailer for raising said second containing means to a level above said first containing means on said pulling vehicle whereby said another portion of said material alone may be transferred from said second containing means on said trailer to said first containing means on said pulling vehicle after said first mentioned portion has been deposited at said given location by said pulling vehicle alone.

References Cited by the Examiner

UNITED STATES PATENTS

| | | |
|---|---|---|
| 1,780,973 | 11/1930 | Graham et al. |
| 2,494,735 | 1/1950 | Ambarcumian _____ 214—38 |
| 3,103,288 | 9/1963 | Pruss _____ 214—502 X |

GERALD M. FORLENZA, *Primary Examiner.*

ROBERT G. SHERIDAN, *Examiner.*